United States Patent
Bennett

(10) Patent No.: US 12,377,969 B2
(45) Date of Patent: Aug. 5, 2025

(54) AIRCRAFT LANDING GEAR SHOCK ABSORBER STRUT WITH MOVABLE DAMPING PIN AND FLOW RESTRICTING PLATE

(71) Applicant: SAFRAN LANDING SYSTEMS UK LTD., Gloucester (GB)

(72) Inventor: Ian Robert Bennett, Gloucester (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/571,061

(22) PCT Filed: Jun. 14, 2022

(86) PCT No.: PCT/EP2022/066148
§ 371 (c)(1),
(2) Date: Dec. 15, 2023

(87) PCT Pub. No.: WO2022/263434
PCT Pub. Date: Dec. 22, 2022

(65) Prior Publication Data
US 2024/0300640 A1    Sep. 12, 2024

(30) Foreign Application Priority Data

Jun. 17, 2021 (EP) .................................. 21180138

(51) Int. Cl.
*B64C 25/60* (2006.01)
*B64C 25/12* (2006.01)
(52) U.S. Cl.
CPC .............. *B64C 25/60* (2013.01); *B64C 25/12* (2013.01)

(58) Field of Classification Search
CPC .......... B64C 25/60; B64C 25/58; B64C 25/12; F16F 9/342
USPC ............................................. 267/64.18, 64.22
See application file for complete search history.

(56) References Cited

U.S. PATENT DOCUMENTS

| | | | |
|---|---|---|---|
| 2,814,482 A | | 11/1957 | Anderson et al. |
| 3,724,832 A | * | 4/1973 | Ceska ........................ F16F 9/06 267/64.22 |
| 4,907,760 A | * | 3/1990 | Sealey ..................... B64C 25/60 244/102 R |

(Continued)

FOREIGN PATENT DOCUMENTS

| | | |
|---|---|---|
| EP | 3069994 A1 | 9/2016 |
| EP | 3345828 A1 | 7/2018 |

(Continued)

OTHER PUBLICATIONS

European Search Report and Search Opinion received for European Application No. 21180138.6, mailed on Nov. 30, 2021, 9 pages.

(Continued)

*Primary Examiner* — Arfan Y. Sinaki
(74) *Attorney, Agent, or Firm* — WOMBLE BOND DICKINSON (US) LLP

(57) ABSTRACT

An aircraft landing gear shock absorber strut including a damping pin and a flow restricting plate having an orifice through which the metering pin axially moves as the sliding tube moves between the extended and compressed positions, wherein the damping pin or the flow restricting plate is coupled to a separator piston so as to move with the separator piston.

16 Claims, 10 Drawing Sheets

(56) References Cited

U.S. PATENT DOCUMENTS

| | | |
|---|---|---|
| 6,676,076 B1 | 1/2004 | Davies |
| 10,591,013 B2 | 3/2020 | Heirendt et al. |
| 2016/0076561 A1 | 3/2016 | Green et al. |
| 2016/0272309 A1 | 9/2016 | Schmidt |
| 2018/0194460 A1 | 7/2018 | Luce |

FOREIGN PATENT DOCUMENTS

| | | |
|---|---|---|
| GB | 2510208 A | 7/2014 |
| WO | 2021/019422 A1 | 2/2021 |

OTHER PUBLICATIONS

International Search Report and Written Opinion received for PCT Patent Application No. PCT/EP2022/066148, mailed on Aug. 17, 2022, 15 pages.
International Search Report and Written Opinion received for PCT Patent Application No. PCT/EP2022/066148, mailed on Sep. 15, 2022, 15 pages.
International Preliminary Report on Patentability received for PCT Patent Application No. PCT/EP2022/066148, mailed on Dec. 28, 2023, 9 pages.
Office Action received for European Application No. 21180138.6, mailed on Jan. 26, 2024, 4 pages.

* cited by examiner

AIRCRAFT LANDING GEAR SHOCK ABSORBER STRUT WITH MOVABLE DAMPING PIN AND FLOW RESTRICTING PLATE

BACKGROUND TO THE INVENTION

It is common for an aircraft landing gear assembly to include a main hydraulic shock absorber strut having an upper end arranged to be pivotally coupled to the underside of the aircraft and a lower end coupled to a wheel and brake assembly.

Such shock absorber struts can comprise an outer cylinder and a sliding tube arranged to telescope relative to the outer cylinder. The shock absorber strut can be compressed and extended as the sliding tube moves relative to the outer cylinder. The two portions are coupled together to define a chamber containing oil and in some cases a gas. As the shock absorber is compressed, oil within the chamber is forced through damping orifices and, where gas is also provided, the gas is compressed, in order to dampen landing loads. The compressed gas serves as a spring to lengthen the shock absorber as applied external load decreases. Recoil damping orifices can be provided to restrict the flow of oil to the annulus as the shock absorber extends.

Such telescopic landing gear can be provided with an elongate metering pin mounted on the sliding tube to move with it, inside the chamber. A mating damping orifice is provided within the chamber, often supported on an orifice support tube. As the sliding tube moves relative to the outer cylinder, a control portion of the metering pin moves through the damping orifice. Variation in the diameter of the metering pin along the control portion varies the free space of the damping orifice through which oil can flow. Thus, the profile of the metering pin affects damping properties of the shock absorber based on shock absorber extension.

EP3069994B1 and WO2021/019422 describe aircraft landing gear shock absorber struts including a metering pin.

The present inventor has devised a new type of aircraft landing gear shock absorber strut that can have one of more of the following advantages relative to known aircraft landing gear shock absorber struts:
  a reduction in mass of the aircraft landing gear shock absorber strut.
  a reduction in the total length of the aircraft landing gear shock absorber strut
  improved ability to provide a metering pin for primary damping of landing loads as well as for recoil damping

SUMMARY OF INVENTION

According to a first aspect of the invention, there is provided an aircraft landing gear shock absorber strut comprising:
  an outer cylinder having an inner surface defining a cylinder bore extending into the outer cylinder from a first axial face of the outer cylinder, the cylinder bore defining an oil chamber;
  a sliding tube movably mounted within the cylinder bore so as to be movable along the cylinder bore between:
    a compressed position in which a first free end portion of the sliding tube disposed outside of the cylinder bore is relative close to the first axial face of the outer cylinder; and
    an extended position in which the first free end portion of the sliding tube is relatively far from the first axial face of the outer cylinder;
  a separator piston movably mounted within a blind bore to separate a gas chamber within the blind bore from the oil chamber such that, as the sliding tube moves from the extended position to the compressed position, oil within the oil chamber forces the separator piston to move to compress the gas within the gas chamber;
  one or more dynamic seals arranged within the cylinder bore between the inner surface of the outer cylinder and an outer surface of the sliding tube to inhibit oil within the oil chamber passing the dynamic seals as the sliding tube moves between the extended and compressed positions;
  a damping pin; and
  a flow restricting plate extending across the blind bore and having a damping orifice through which the damping pin axially moves as the sliding tube moves between the extended and compressed positions,
  wherein the damping pin or the flow restricting plate is coupled to the separator piston so as to move with the separator piston.

The damping pin can have a longitudinal axis which is coaxial with the axis of the bore. This can provide a symmetrical arrangement within the oil chamber.

The damping orifice can have an office axis which is coaxial with axis of the bore.

The sliding tube can define the blind bore. Thus, the separator piston can be mounted within the sliding tube.

The damping pin can have a cross sectional profile which corresponds to or matches that of the damping orifice; for example, the damping pin and damping orifice can each have a circular profile.

The damping pin can be coupled to extend from an axial face of the separator piston which faces away from the gas chamber.

The damping pin can have a control portion having a first end which is disposed within the damping orifice when the sliding tube is in the extended position and a second end which is disposed within the damping orifice when the sliding tube is in the compressed position.

The damping pin can comprise a metering pin.

The metering pin can be outwardly tapered as it extends from the separator piston. At least the control portion can be outwardly tapered from the first end to the second end.

The metering pin can alternatively have a cylindrical outer profile with one or more grooves of varying depth extending along the pin.

The damping pin can alternatively comprise a 'piccolo' tube. Fluid flow through the lateral holes is successively closed off (or opened up) as the holes pass from one side of the flow restricting plate to the other.

The flow restricting plate can be coupled to the sliding tube to move with the sliding tube.

The sliding tube can further comprise an second free end portion coupled to the first free end portion by an outwardly tapered shoulder portion to define part of the oil chamber, a diameter of the second free end portion being less than a diameter of the first free end portion, the second free end portion extending through a second opening in second axial face of the outer cylinder such as, as the sliding tube moves from the extended position to the compressed position, the second end portion moves away from the second axial face of the outer cylinder. Thus, in such embodiments the shock absorber strut can be of 'pogo stick' arrangement.

Alternatively, the flow restricting plate is coupled to the outer cylinder via a cylindrical orifice support tube.

The orifice support tube can include one or more openings in the sidewall for passage of oil.

An end portion of the orifice support tube furthest from the first axial face of the outer cylinder can define a second blind bore, with a second separator piston movably mounted within the second blind bore to separate the second blind bore into a second gas chamber and the oil chamber such that as the sliding tube moves from the extended position to the compressed position, oil within the oil chamber forces the separator piston to move to compress the gas within the second gas chamber.

According to a second aspect of the invention, there is provided an aircraft landing gear assembly comprising:

the aircraft landing gear shock absorber strut according to the first aspect; and a wheel or other ground contacting assembly coupled to the shock absorber strut.

The landing gear assembly can comprise a side stay, drag stay or plunger lock arrangement coupled to the shock absorber strut and arranged to enable the shock absorber strut to be maintained in a deployed condition relative to an aircraft to which the landing gear assembly is movably coupled.

BRIEF DESCRIPTION OF THE DRAWINGS

Embodiments of the invention will now be described, strictly by way of example only, with reference to the accompanying drawings, of which.

DESCRIPTION OF EMBODIMENTS

Figure 1:
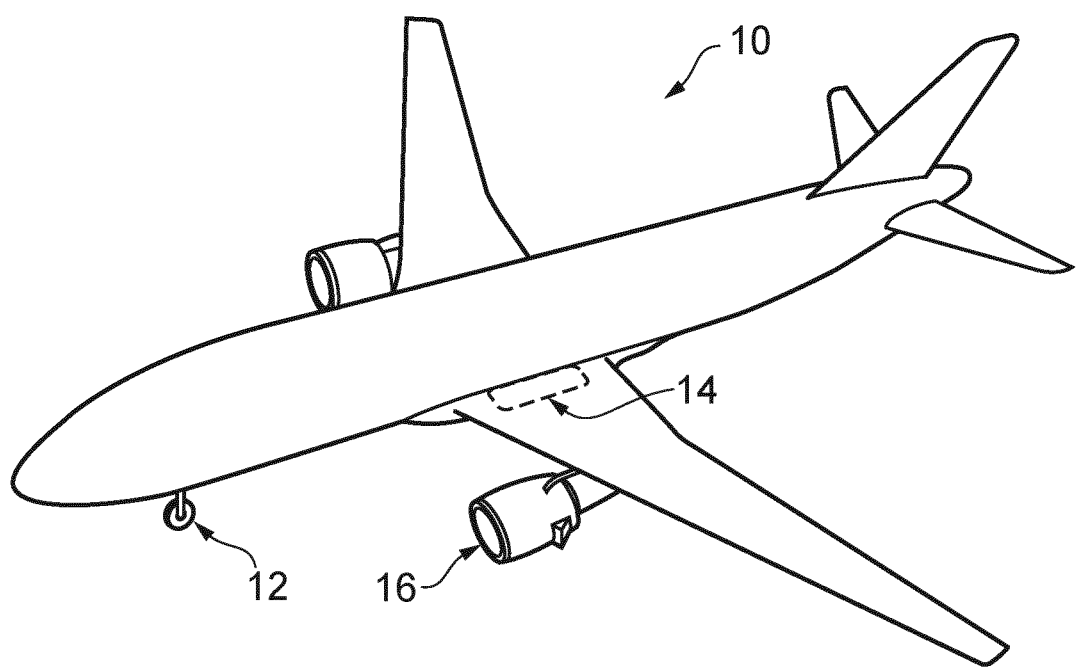
FIG. 1 is a diagram of an aircraft.

FIG. 1 is a diagram of an aircraft 10. The aircraft 10 includes assemblies such as a nose landing gear 12, main landing gear 14 and engines 16. The landing gear 12, 14 each includes a shock absorber strut for damping landing loads and supporting the weight of the aircraft 10 when it is on the ground. The term aircraft as used herein can include aeroplanes, helicopters and the like having mass in excess of 450 Kg.

Referring now to FIGS. 2a to 2e, an aircraft assembly, namely an aircraft landing gear assembly, is shown generally at 14. FIGS. 2a to 2e are an example of an aircraft landing gear assembly which can include a shock absorber strut according to an embodiment of the invention. It will however be appreciated that shock absorber struts according to embodiments of the invention can be used in a range of types of aircraft landing gear.

The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising an outer cylinder 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the outer cylinder such that extension and retraction of the actuator results in movement of the outer cylinder between deployed and stowed conditions.

Figure 2A:
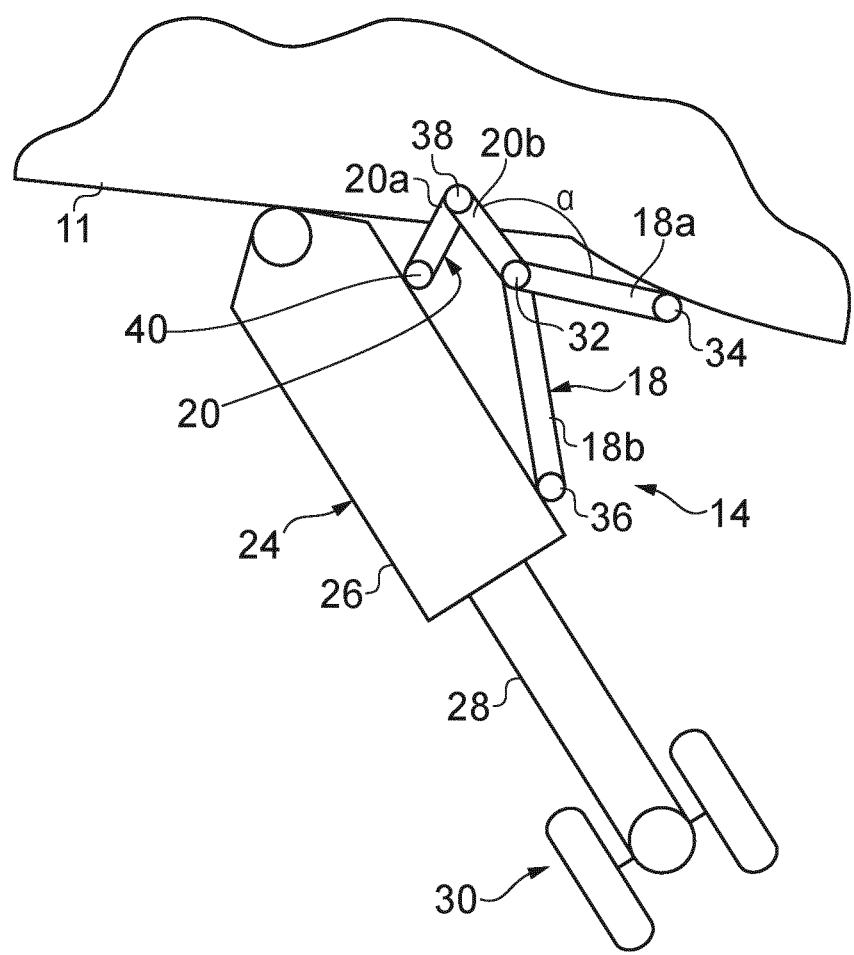
FIGS. 2a to 2e are diagrams of an aircraft landing gear assembly.
Figure 2B:
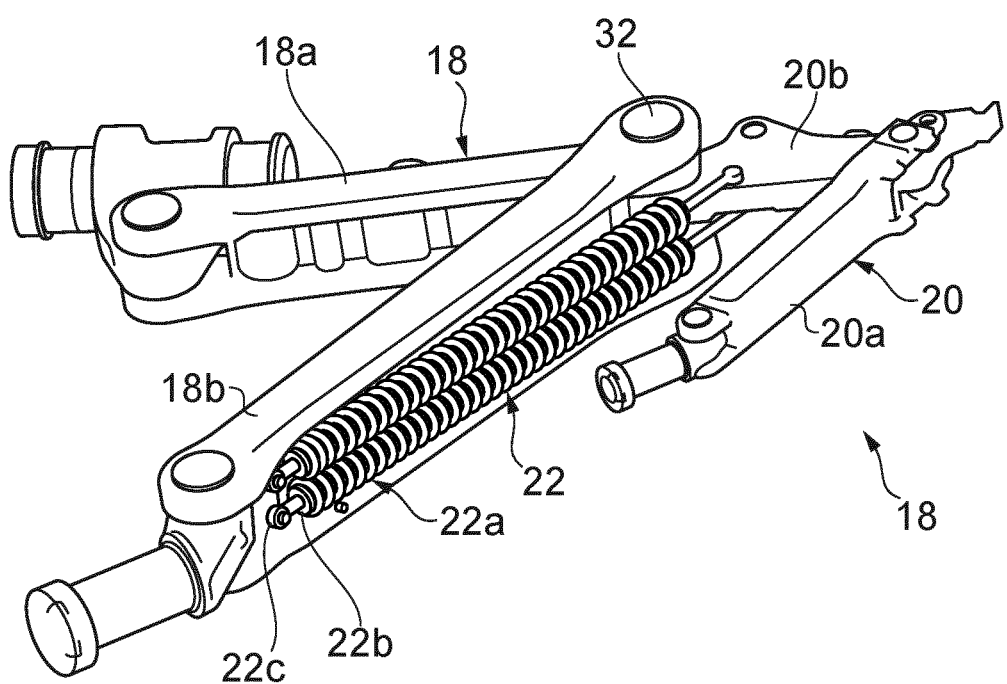
Figure 2C:
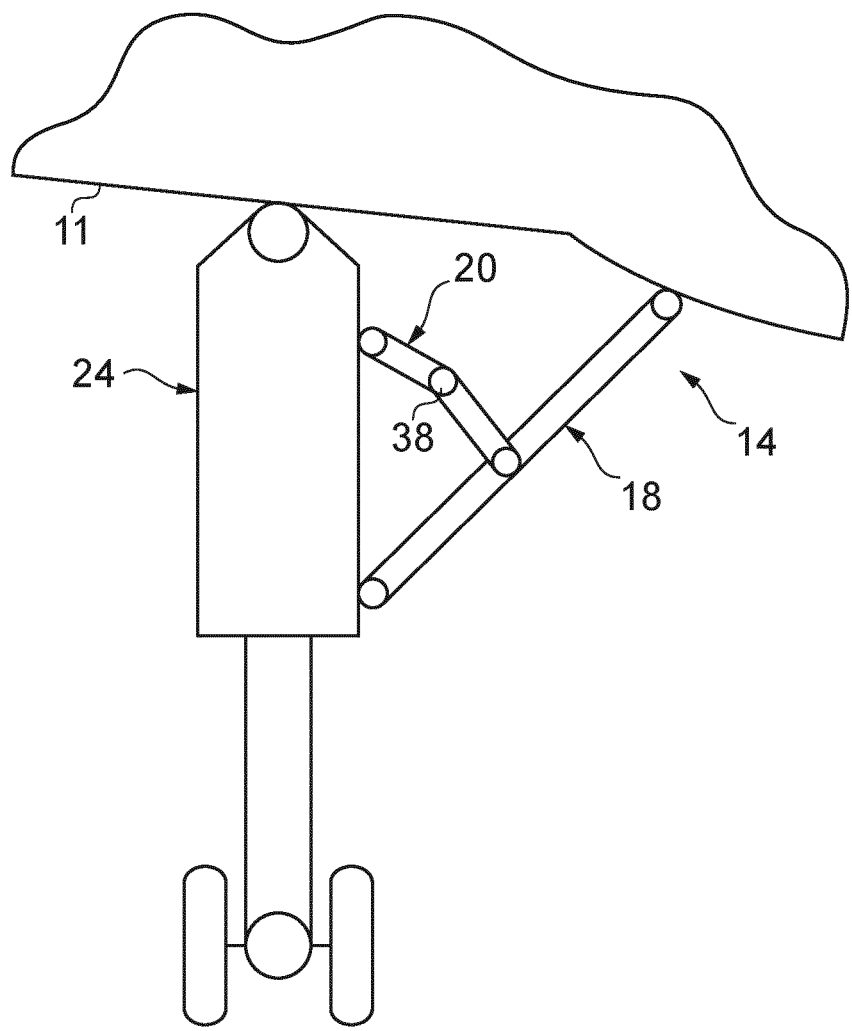

The stay 18 serves to support the orientation of the outer cylinder 26 when the landing gear is in the deployed condition. The stay 18 generally includes a two bar linkage that can be unfolded to assume a generally straight or aligned, over centre condition in which the stay 18 is locked to inhibit movement of the outer cylinder, as shown in FIGS. 2c and 2e. When the stay is broken, it no longer prevents pivotal movement of the outer cylinder 26 and the outer cylinder 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorber strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the outer cylinder 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the outer cylinder 26. A lower end of the lower link arm 20b defines a lug that is pivotally coupled to lugs of the stay arms 18a, 18b via the pivot pin 32. Lugs of the upper stay arm 18a are in this example disposed between the lugs of the lower stay arm 18b and the lugs of the lower link arm 20b.

Figure 2D:
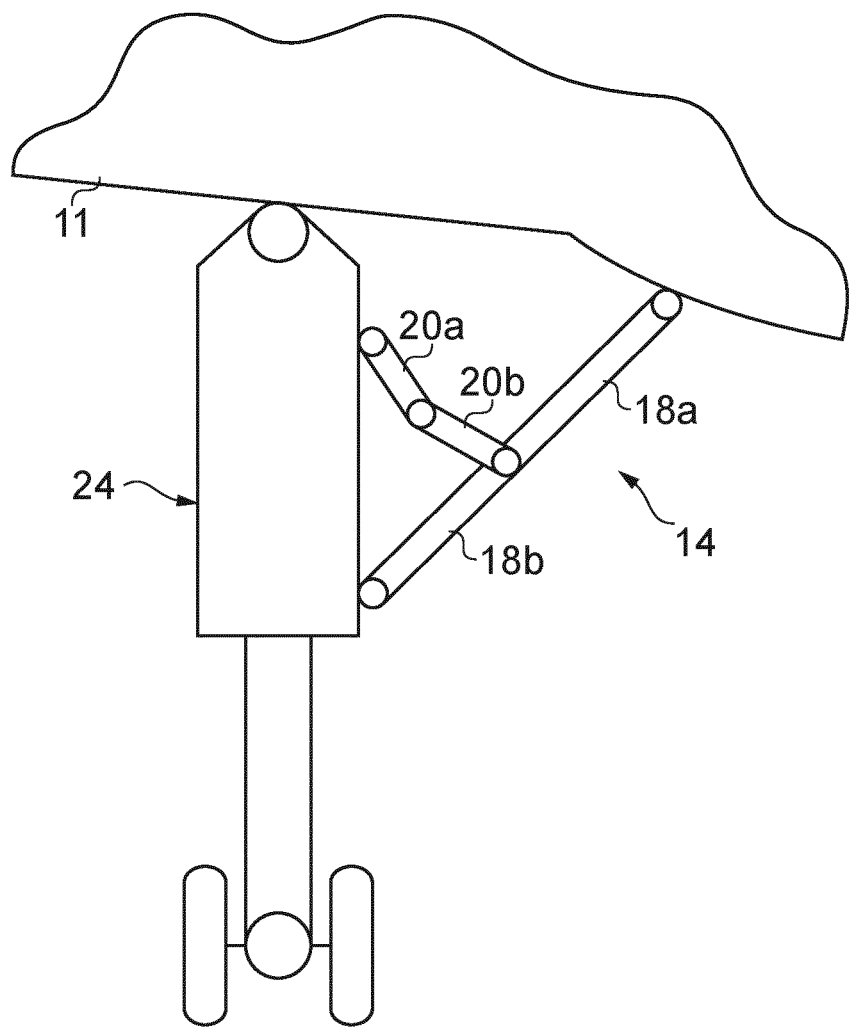
Figure 2E:
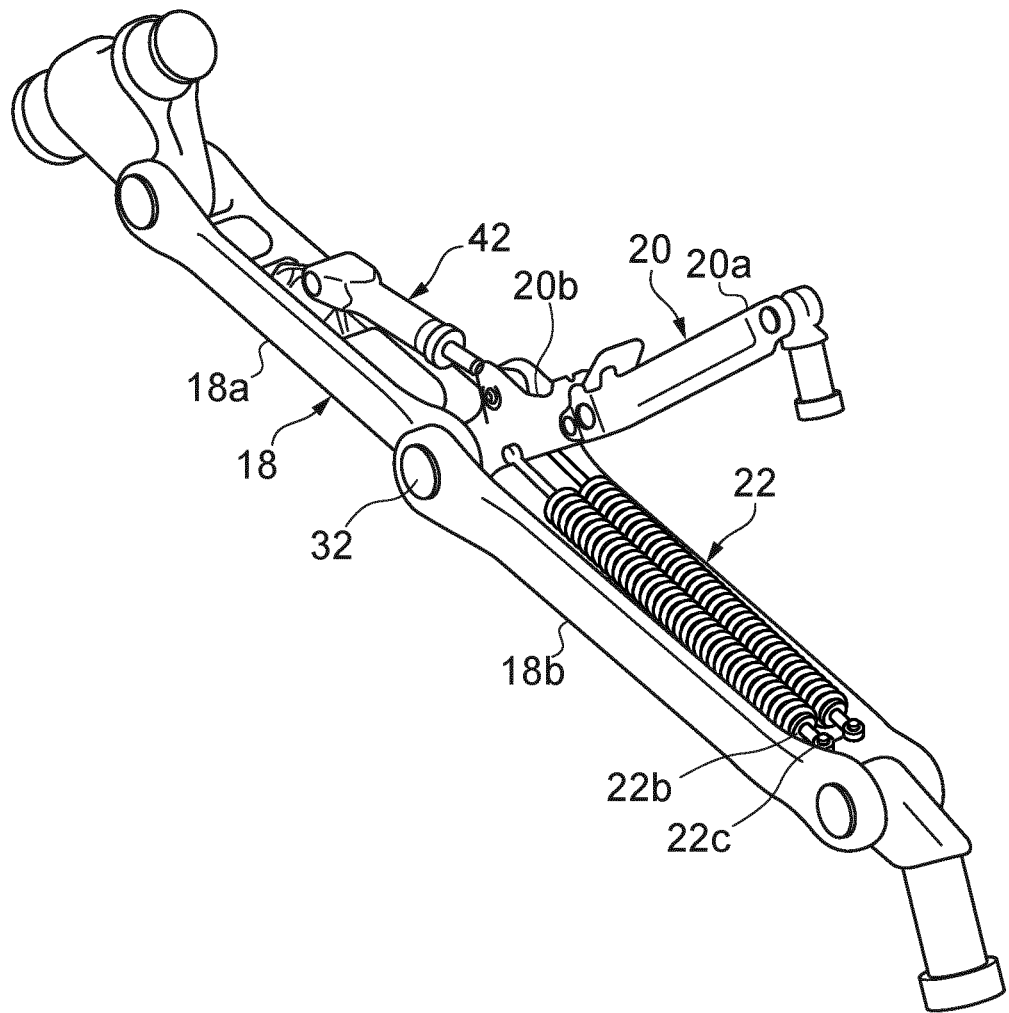

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the outer cylinder 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally metal coil springs, which can be coupled between the lock link and another part of the landing gear assembly, such as an arm of the stay assembly, as shown in FIGS. 2*b* and 2*e*.

The spring assembly 22 is arranged to bias the lock link 20 towards the locked condition by way of spring tension. A distal end of the spring 22*a* is coupled to the lower stay arm 18*b* via a lower engagement formation 22*b* which in turn is coupled to an anchor point defined by the lower connector 22*c*.

The coil spring of the spring assembly 22 is at its shortest when the landing gear assembly is in the deployed condition, as shown in FIG. 2*e*, and at its longest when the landing gear assembly approaches the stowed condition, as shown in FIG. 2*b*. As the landing gear assembly is retracted towards the stowed condition, the spring of each spring assembly extends, resulting in increased spring load and torsional stress.

Referring to FIG. 2*e*, a lock stay actuator 42 is coupled between the upper stay arm 18*a* and lower link arm 20*b* and arranged to pivotally move the link arms 20*a, b* so as to 'lock' and 'unlock' the lock link 20, as illustrated in FIG. 2*c*. The actuator 42 can break the lock link 20 against the down lock spring bias, allowing the landing gear assembly to be folded and stowed as described previously.

Figure 3:
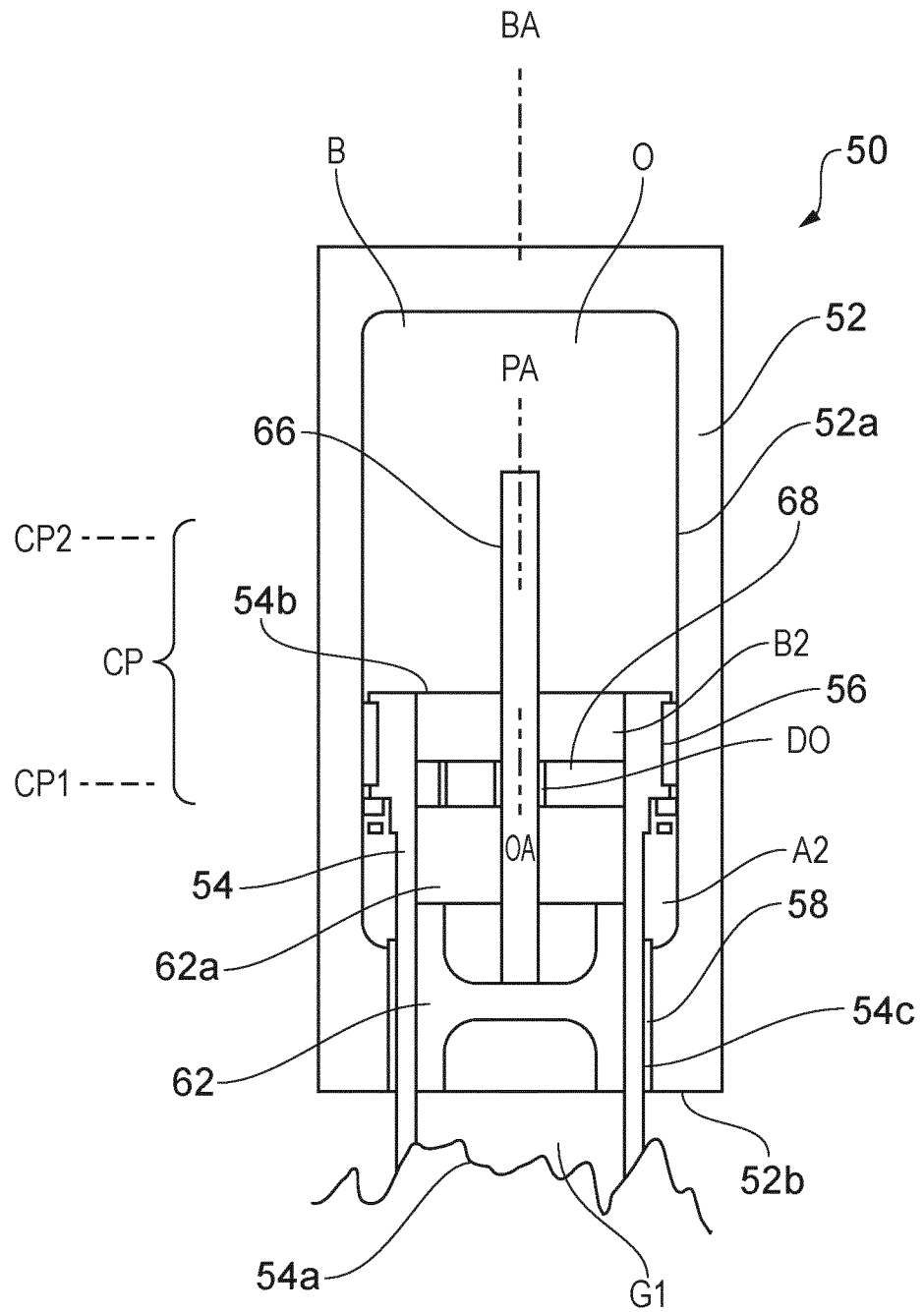
FIG. 3 is a diagram of an aircraft landing gear assembly shock absorber strut according to an embodiment of the invention.

FIG. 3 is a diagram of an aircraft landing gear shock absorber strut 50 according to an embodiment of the invention.

The shock absorber strut 50 comprises an outer cylinder 52 having an inner surface 52*a* defining a cylinder bore B extending into the outer cylinder from a first axial face 52*b* of the outer cylinder 52. The cylinder 52 is elongate and in this embodiment is of circular cross section.

A sliding tube 54 is movably mounted within the cylinder bore B so as to be movable along the cylinder bore B between a compressed position in which a first free end portion 54*a* of the sliding tube 54 disposed outside of the bore B is relatively close to the first axial face 52*b* of the outer cylinder 52 and an extended position in which the first free end portion 54*a* of the sliding tube 54 is relatively far from the first axial face 52*b* of the outer cylinder 52.

An upper bearing 56 is mounted near the inner end 54*b* of the sliding tube 54 to slide against the inner surface 52*a* defining the bore B. The lower end of the cylinder 52 can be provided with a lower bearing assembly sleeve insert 58 to define a lower bearing arranged to act on the outer surface 54*c* of the sliding tube 54 as it moves between the compressed and extended positions. A gland nut (not shown) can be screwed into the end of the bore to retain the lower bearing assembly 58. However, in other embodiments, any suitable bearing assembly can be utilised; for example, the upper bearing can be mounted on the cylinder 52 and arranged to act on the sliding tube 54.

The cylinder bore defines an oil chamber O. A space within the bore B between the cylinder 52 and sliding tube 54 defines an annulus A2 which varies in size as the sliding tube 54 as it moves between the compressed and extended positions.

The sliding tube defines a blind bore B2. A separator piston 62 is movably mounted within the blind bore B2 to separate a gas chamber G1 within the blind bore B2 from the oil chamber O such that, as the sliding tube 54 moves from the extended position to the compressed position, oil within the oil chamber O forces the separator piston 62 to move to compress the gas within the gas chamber G1, thereby absorbing landing loads. The oil can comprise any suitable hydraulic liquid and the gas can comprise nitrogen for example.

One or more dynamic seals (not shown) are arranged within the cylinder bore B between the inner surface of the outer cylinder 52 and an outer surface of the sliding tube 54 to inhibit oil within the oil chamber O passing the dynamic seals as the sliding tube 54 moves between the extended and compressed positions. In this embodiment, the dynamic seals are mounted on the lower bearing sleeve assembly 58.

The radially enlarged region of the sliding tube 54 at the upper bearing 56 can be provided with plurality of damping orifices at least some, but not all, of which are provided with one way valves such as oil can flow relative easily through them as the shock absorber is compressed but flow is relatively difficult in the reverse direction, in order to provide recoil damping as oil flows from the annulus back into the main region of the oil chamber O.

The shock absorbing strut 50 also includes an elongate metering pin 66 configured to work with a mating damping orifice DO to provide variable damping based on the extension state of the strut 50.

In this embodiment the metering pin 66 is mounted on the separator piston 62 and has a longitudinal axis PA which is coaxial with the axis BA of the bore B. The metering pin 66 is coupled to extend from an axial face 62*a* of the separator piston 62 which faces away from the gas chamber G1. Thus, the metering pin 66 extends towards and into the oil chamber O. The metering pin 66 can for example be attached to the separator piston 62 by via a spigot that passes through the wall of the separator piston, or by a screw thread, nut, bolted flange or other convenient means, or can be integrally formed with the piston 62.

The mating damping orifice DO is formed through a flow restricting plate 68 extending across the blind bore B2. In this embodiment the flow restricting plate 68 is coupled to the sliding tube 54 to move with the sliding tube. The flow restricting plate 68 can be attached to the sliding tube 54 by dowels, screw thread, trapped ring or other convenient means.

The metering pin 66 axially moves through the mating damping orifice DO as the sliding tube 54 moves between the extended and compressed positions. The present inventor has realised that, due to oil within the oil chamber being generally incompressible, the motion between the separator piston 62 and the sliding tube 54 will reflect the motion between the outer cylinder 52 and the sliding tube 54. There may be a small positional offset due to temperature or servicing tolerance, but this can be tolerated. By arranging the metering pin 66 and mating orifice DO between the separator piston 62 and the sliding tube 52, a metering pin can be provided without the requirement for, and therefore mass associated with an orifice support tube mounted on the outer cylinder.

The metering pin has a control portion CP having a first end CP1 which is disposed within the damping orifice DO when the sliding tube 52 is in the extended position and a second end CP2 which is disposed within the damping orifice DO when the sliding tube 52 is in the compressed position. Due to the direction of motion the metering pin 66 is outwardly tapered as it extends from the separator piston 62, but in other embodiments just the control portion CP can be outwardly tapered from the first end CP1 to the second end CP2. Depending upon the damping requirements of a particular application the metering pin may have regions of no taper or of reverse taper. Alternatively, the metering pin may have a cylindrical outer surface with one or more axial grooves of varying depth.

In this embodiment the damping orifice DO has an orifice axis OA which is coaxial with axis BA of the bore B. The metering pin 66 can have a cross sectional profile which corresponds to or matches that of the damping orifice DO; for example, the metering pin 66 and damping orifice DO can each have a circular profile. However, in other embodiments the metering pin and damping orifice can have any suitable arrangement.

Figure 4:
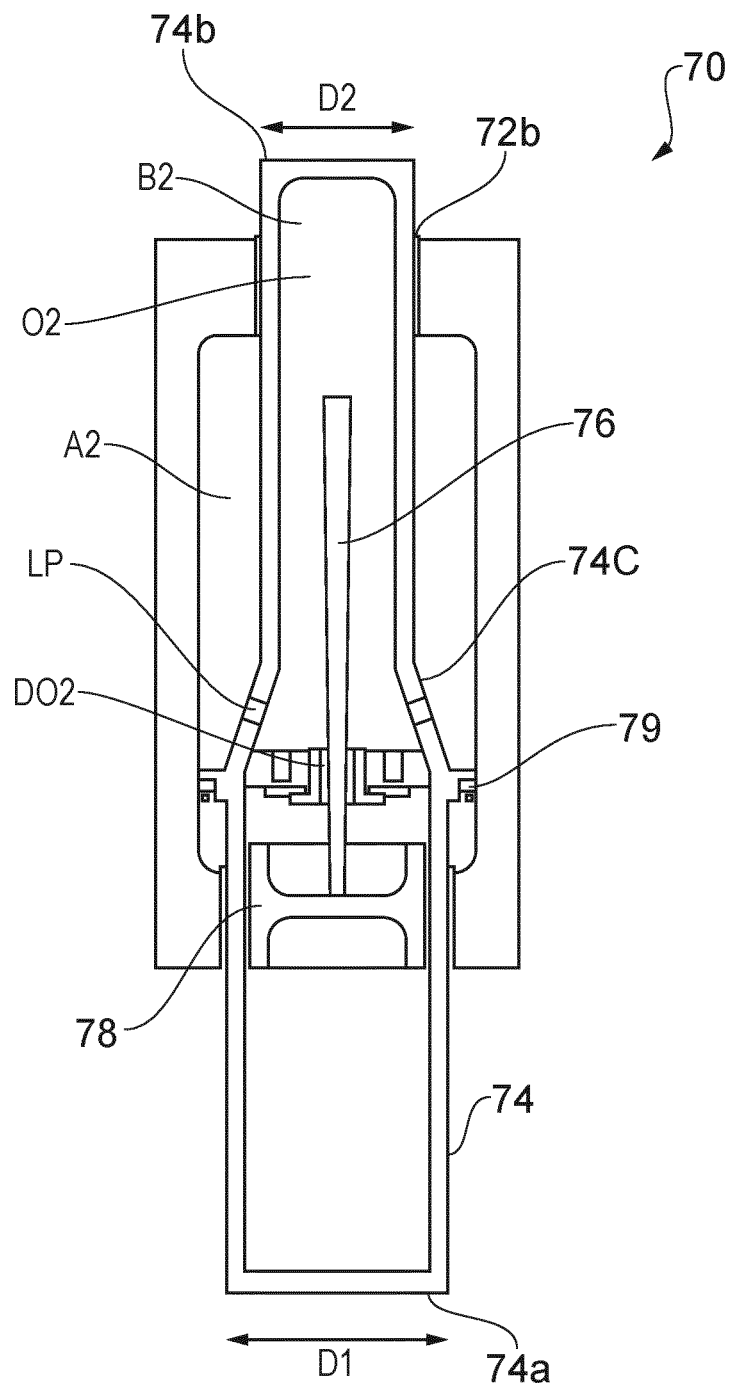
FIG. 4 is a diagram of an aircraft landing gear assembly shock absorber strut according to a further embodiment of the invention.

Referring now to FIG. 4, an aircraft landing gear shock absorber strut 70 according to a further embodiment of the invention is shown. In this embodiment the strut is a 'pogo stick' type shock absorber. The strut 70 is similar to the strut 50 of FIG. 3 and for brevity the following description will focus on the differences.

In this embodiment the sliding tube 74 further comprises a second free end portion 74*b* mechanically coupled to the first free end portion 74*a* by an outwardly tapered shoulder portion 74C. Thus, the diameter D2 of the second free end portion 74*b* is less than the diameter D1 of the first free end portion 74*a*.

The second free end portion 74*b* extends through a second opening in a second axial face 72*b* of the outer cylinder 72 such as, as the sliding tube 74 moves from the extended position to the compressed position, the second end portion 74*b* moves upwardly, away from the second axial face of the outer cylinder 72.

The second free end portion 74*b* defines a blind bore B3 to which forms part of the oil chamber O2. Lateral passages LP are formed through the shoulder portion 74C to enable oil exchange with the annulus A2.

A recoil damping piston ring 79 is mounted at the region where the first free end portion 74*a* meets the tapered shoulder portion 74C and arranged to act on the inner surface of the outer cylinder 72. The recoil damping piston ring 79 can for example be a sprung metallic piston ring with some bypass and additional recoil restriction.

The present invention has noted that by mounting the metering pin 76 and mating damping orifice DO2 arrangement between the separator piston 78 and the sliding tube 74, this enables a metering pin to be used on a pogo stick type aircraft landing gear shock absorber strut. Since the annular chamber of a pogo-stick gear is used for recoil damping, any conventional positional metering device (acting between the sliding tube and outer cylinder) in this chamber would by-pass the recoil damping orifices.

Figure 5:
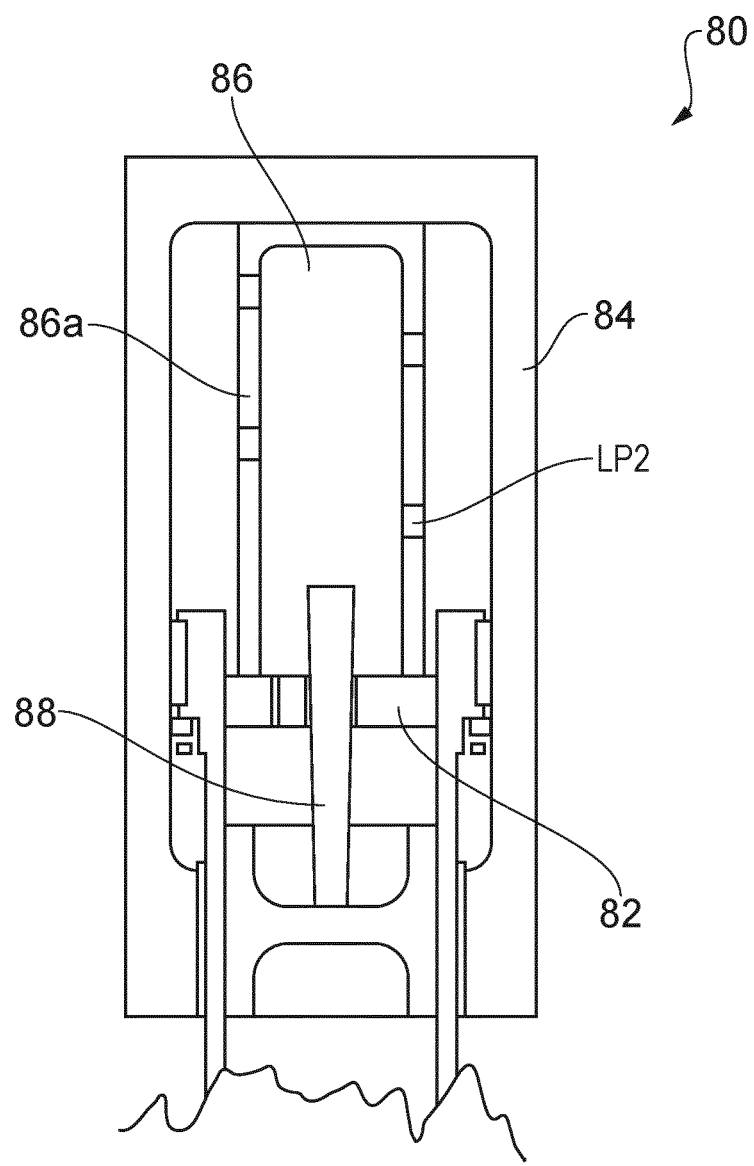
FIG. 5 is a diagram of an aircraft landing gear assembly shock absorber strut according to a further embodiment of the invention.

Referring now to FIG. 5, an aircraft landing gear shock absorber strut 80 according to a further embodiment of the invention is shown. The strut 80 is similar to the strut 50 of FIG. 3 and for brevity the following description will focus on the differences.

In this embodiment, rather than the mating damping orifice being formed through a flow restricting plate coupled to the sliding tube across the blind bore, the flow restricting plate 82 is coupled to the outer cylinder 84 via a cylindrical orifice support tube 86 including one or more lateral passages LP2 in the sidewall 86*a* for passage of oil.

By arranging the metering pin and mating orifice between the separator piston and the outer cylinder, the length and therefore the mass of the metering pin 88 can be reduced relative to the arrangement of FIG. 3. With a separated or 'dry' shock absorber with the separator piston in the sliding tube, the relative motion between the separator piston and the main fitting is for the separator piston to slowly drop, with much less relative movement than the sliding tube relative to the main fitting. Hence a shorter, lighter, lower cost metering pin can be used by attaching it to the separator piston rather than between the sliding tube and the outer cylinder as per conventional arrangements.

Figure 6:
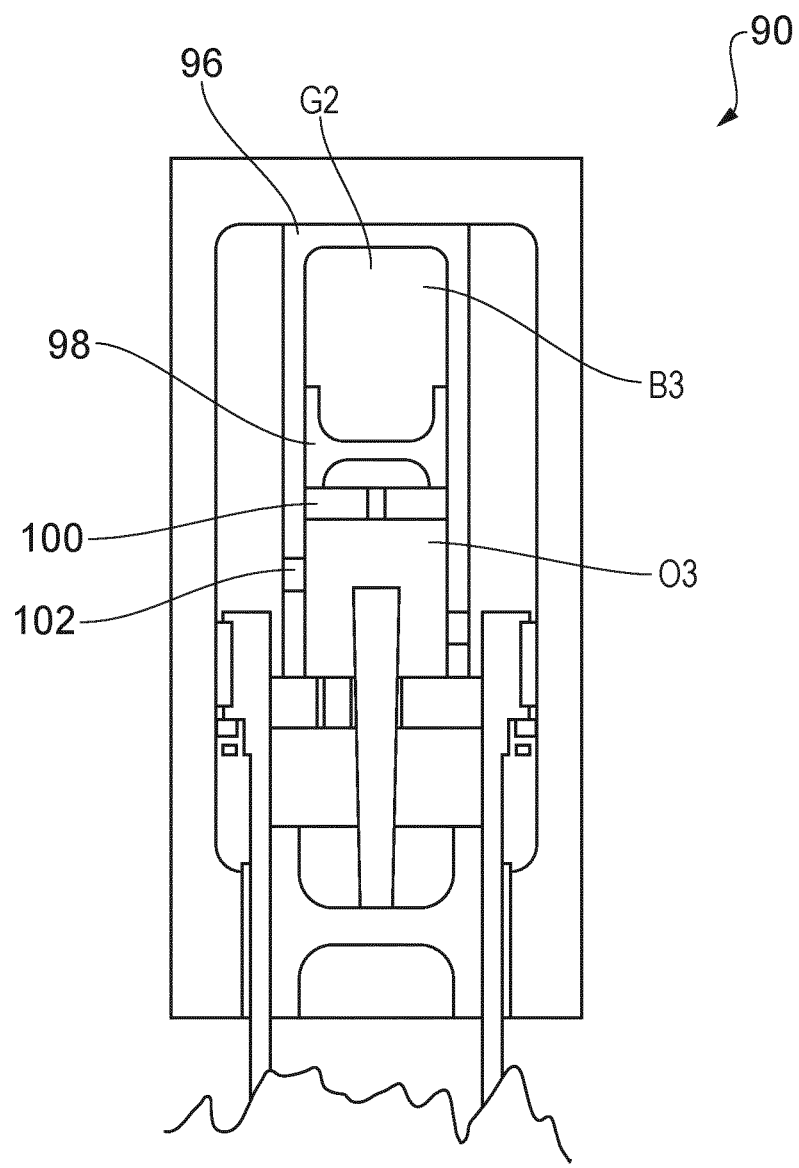
FIG. 6 is a diagram of an aircraft landing gear assembly shock absorber strut according to a further embodiment of the invention.

Referring now to FIG. 6, an aircraft landing gear shock absorber strut 90 according to a further embodiment of the invention is shown. The strut 90 is similar to the strut 80 of FIG. 5 and for brevity the following description will focus on the differences.

In this embodiment, the orifice support tube 96 define a second blind bore B3, with a second separator piston 98 movably mounted within the second blind bore to separate the second blind bore into a second gas chamber G2 and the oil chamber O3 such that as the sliding tube moves from the extended condition to the compressed condition, oil within the oil chamber O3 forces the separator piston to move to compress the gas within the second gas chamber G2 once the pressure exceeds the initial gas inflation pressure of chamber G2. A lateral plate 100 extends across the second blind bore B3 to serve as an end stop for the second separator piston 98. The orifice support tube 96 includes one or more lateral passages 102 in the sidewall for passage of oil. Likewise, the lateral plate 100 includes one or more passages for passage of oil.

In other embodiments, the damping pin can be mounted on a separator piston in the outer cylinder, such as the second separator piston 98 of FIG. 6.

In any embodiment, it is preferred that metering pin be on the separator piston and the orifice on the slider or orifice support tube, although an inverted arrangement would be possible.

In any embodiment, the metering pin can be replaced by a piccolo tube, where the cydlindical tube is hollow and has one or more holes at the base of the tube and a series of holes along the tube such that oil flows through holes that are progressively cut off as the tube moves through the damping plate, in step changes.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear shock absorber strut comprising:
   an outer cylinder having an inner surface defining a cylinder bore extending into the outer cylinder from a first axial face of the outer cylinder, the cylinder bore defining an oil chamber;
   a sliding tube being movably mounted within the cylinder bore so as to be movable along the cylinder bore between:
      a compressed position in which a first free end portion of the sliding tube disposed outside of the cylinder bore is situated a first distance from the first axial face of the outer cylinder; and
an extended position in which the first free end portion of the sliding tube is situated a second distance from the first axial face of the outer cylinder, the second distance being greater than the first distance;
a separator piston movably mounted within a blind bore to separate a gas chamber within the blind bore from the oil chamber such that, as the sliding tube moves from the extended position to the compressed position, oil within the oil chamber forces the separator piston to move to compress the gas within the gas chamber;
one or more dynamic seals arranged within the cylinder bore between the inner surface of the outer cylinder and an outer surface of the sliding tube to inhibit oil within the oil chamber passing the dynamic seals as the sliding tube moves between the extended and compressed positions;
a damping pin; and
a flow restricting plate extending across the blind bore and having an orifice through which the damping pin axially moves as the sliding tube moves between the extended and compressed positions,
wherein the damping pin is coupled to the separator piston so as to move with the separator piston.

2. The aircraft landing gear shock absorber strut according to claim 1, wherein the damping pin has a longitudinal axis which is coaxial with the axis of the cylinder bore.

3. The aircraft landing gear shock absorber strut according to claim 1, wherein the damping pin is coupled to extend from an axial face of the separator piston which faces away from the gas chamber.

4. The aircraft landing gear shock absorber strut according to claim 1, wherein the damping pin comprises a metering pin.

5. The aircraft landing gear shock absorber strut according to claim 4, wherein the metering pin is outwardly tapered as it extends from the separator piston.

6. The aircraft landing gear shock absorber strut according to claim 1, wherein the damping pin comprises a piccolo tube.

7. The aircraft landing gear shock absorber strut according to claim 1, wherein the sliding tube defines the blind bore.

8. The aircraft landing gear shock absorber strut according to claim 1, wherein the flow restricting plate is coupled to the sliding tube to move with the sliding tube.

9. The aircraft landing gear shock absorber strut according to claim 8, wherein the sliding tube further comprises a second free end portion coupled to the first free end portion by an outwardly tapered shoulder portion to define part of the oil chamber, a diameter of the second free end portion being less than a diameter of the first free end portion, the second free end portion extending through a second opening in second axial face of the outer cylinder such that, as the sliding tube moves from the extended position to the compressed position, the second end portion moves away from the second axial face of the outer cylinder.

10. The aircraft landing gear shock absorber strut according to claim 3, wherein flow restricting plate is coupled to the outer cylinder via a cylindrical orifice support tube.

11. The aircraft landing gear shock absorber strut according to claim 10, wherein the cylindrical orifice support tube includes one or more openings in a sidewall thereof for passage of oil.

12. The aircraft landing gear shock absorber strut according to claim 11, wherein an end portion of the orifice support tube furthest from the first axial face of the outer cylinder defines a second blind bore, with a second separator piston movably mounted within the second blind bore to separate the second blind bore into a second gas chamber and the oil chamber such that as the sliding tube moves from the extended position to the compressed position, oil within the oil chamber forces the separator piston to move to compress the gas within the second gas chamber.

13. An aircraft landing gear assembly comprising:
the aircraft landing gear shock absorber strut according to claim 1; and
a ground contacting assembly coupled to the shock absorber strut.

14. The aircraft landing gear assembly according to claim 13, comprising a side stay, drag stay coupled to the shock absorber strut and arranged to enable the shock absorber strut to be maintained in a deployed condition relative to an aircraft to which the landing gear assembly is movably coupled.

15. An aircraft landing gear assembly according to claim 13, wherein the ground contacting assembly comprises a wheel assembly.

16. An aircraft landing gear shock absorber strut comprising:
an outer cylinder having an inner surface defining a cylinder bore extending into the outer cylinder from a first axial face of the outer cylinder, the cylinder bore defining an oil chamber;
a sliding tube being movably mounted within the cylinder bore so as to be movable along the cylinder bore between:
a compressed position in which a first free end portion of the sliding tube disposed outside of the cylinder bore is situated a first distance from the first axial face of the outer cylinder; and
an extended position in which the first free end portion of the sliding tube is situated a second distance from the first axial face of the outer cylinder, the second distance being greater than the first distance;
a separator piston movably mounted within a blind bore to separate a gas chamber within the blind bore from the oil chamber such that, as the sliding tube moves from the extended position to the compressed position, oil within the oil chamber forces the separator piston to move to compress the gas within the gas chamber;
one or more dynamic seals arranged within the cylinder bore between the inner surface of the outer cylinder and an outer surface of the sliding tube to inhibit oil within the oil chamber passing the dynamic seals as the sliding tube moves between the extended and compressed positions;
a damping pin; and
a flow restricting plate extending across the blind bore and having an orifice through which the damping pin axially moves as the sliding tube moves between the extended and compressed positions,
wherein the flow restricting plate is coupled to the separator piston so as to move with the separator piston.

* * * * *